UNITED STATES PATENT OFFICE.

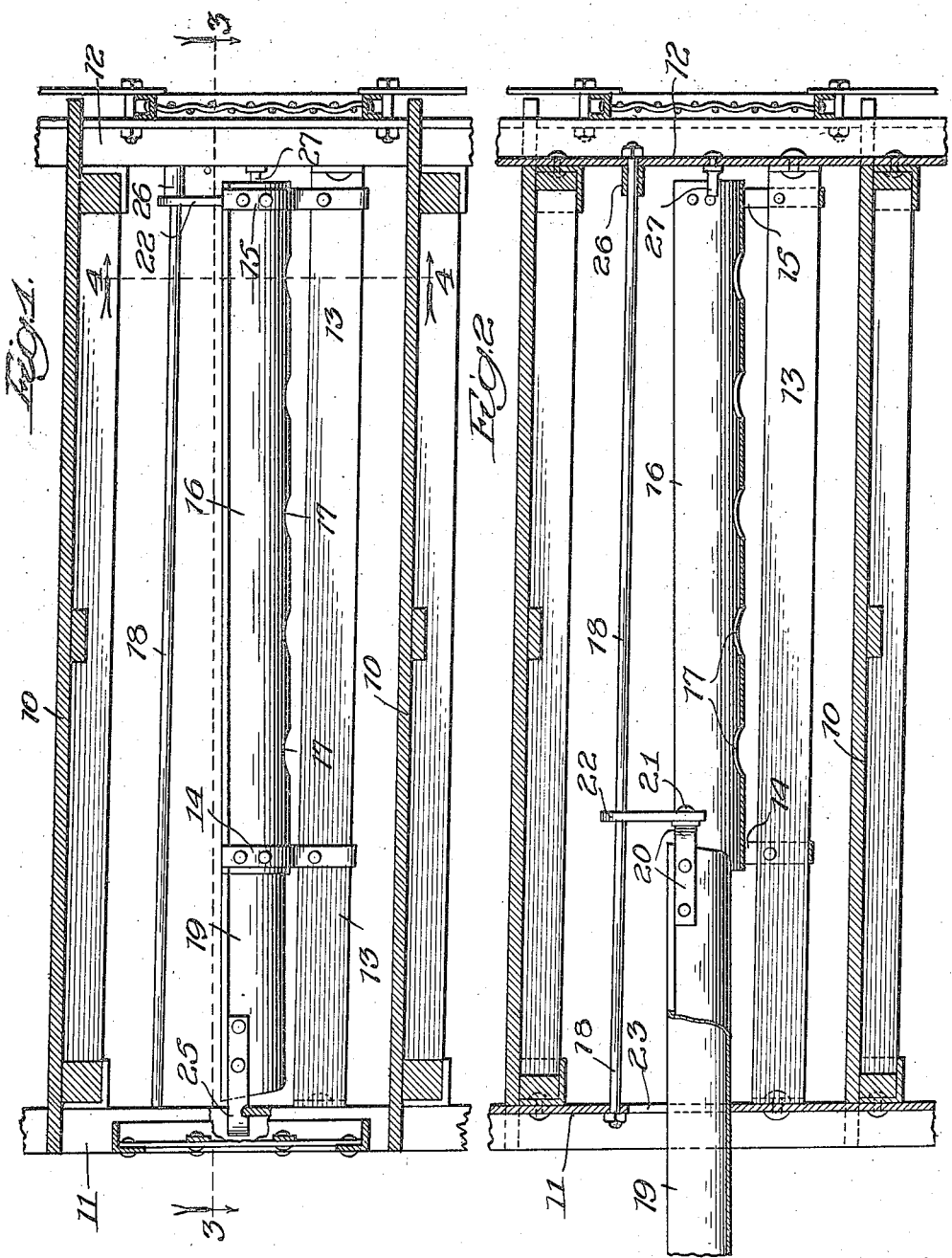

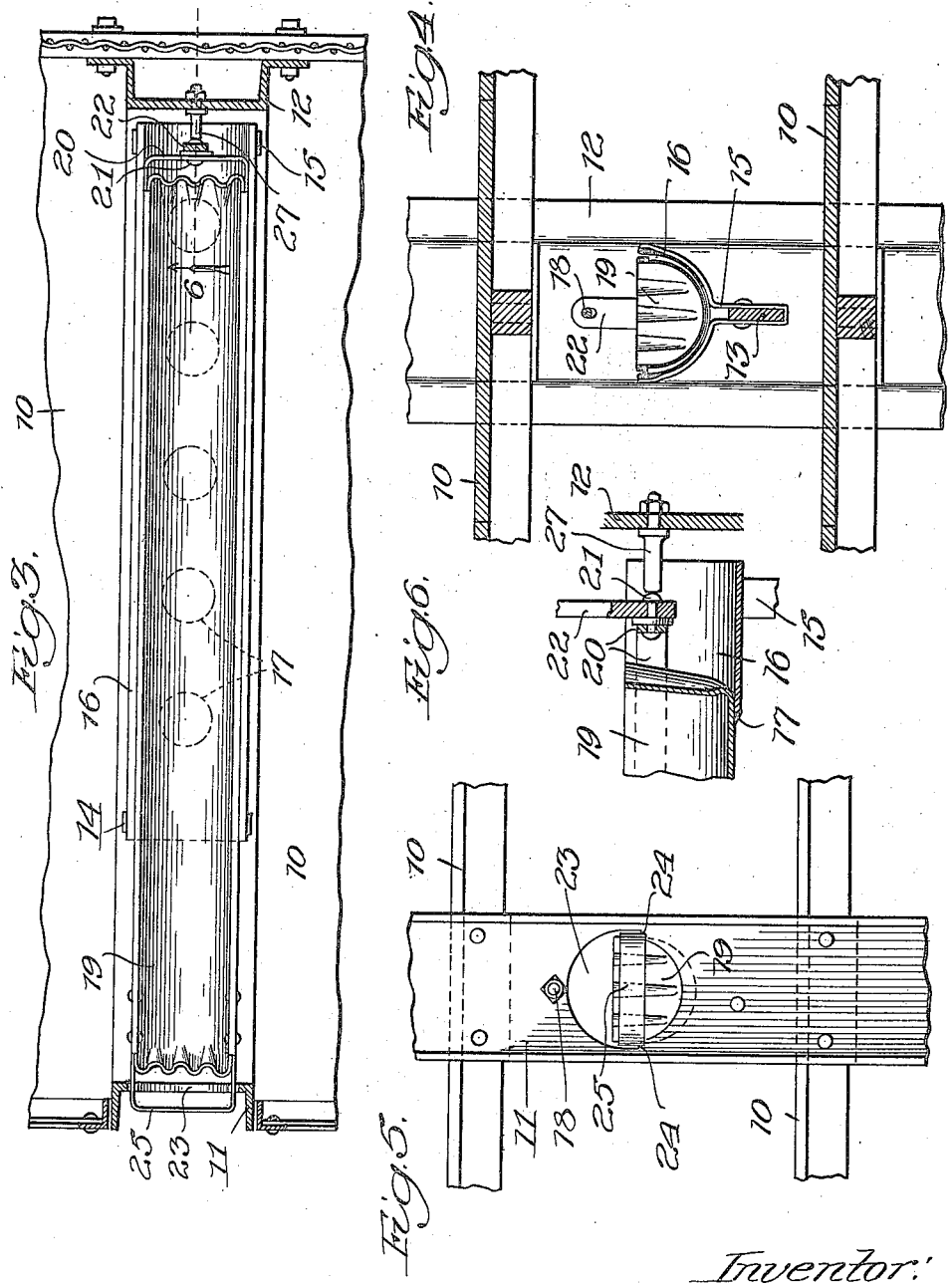

PETER KORTENHOEVEN, OF CHICAGO, ILLINOIS, ASSIGNOR, BY MESNE ASSIGNMENTS, TO EQUIPMENT DEVICES COMPANY, A CORPORATION OF MAINE.

FEED TROUGH.

1,425,205.      Specification of Letters Patent.    Patented Aug. 8, 1922.

Application filed December 12, 1921. Serial No. 521,725.

*To all whom it may concern:*

Be it known that I, PETER KORTENHOEVEN, a citizen of the United States, residing at 431 South Dearborn Street, Chicago, in the county of Cook and State of Illinois, have invented a new and useful Improvement in Feed Troughs, of which the following is a specification.

This invention relates to feed troughs such as are used in poultry cars and the like and is fully described in the following specification and shown in the accompanying drawings, in which:

Figure 1 is a partial vertical section through a poultry car showing my invention with the feed trough in closed position;

Fig. 2 is the same showing the feed trough drawn into the aisle;

Fig. 3 is a horizontal view partly in section on the line 3—3 of Fig. 1;

Fig. 4 is a partial vertical section on the line 4—4 of Fig. 1;

Fig. 5 is a front elevation of an aisle post; and

Fig. 6 is a partial vertical section on the line 6 of Fig. 3.

The invention as illustrated is a poultry car having a series of tiers of coops each having a floor 10 which is carried in any suitable manner between aisle posts 11 and outer posts 12 forming the structure of the car. A partition member 13 is secured to two of these posts and carries yokes 14 and 15 which serve to support the ends of the shell 16. This shell as illustrated is preferably semi-cylindrical, and is preferably supplied with a series of large openings 17 through which dirt and water falling in the shell may pass. A rod 18 is also carried by the posts 11 and 12 vertically above the shell 16.

A trough 19 which is preferably semi-cylindrical has a yoke 20 at its outer end which carries a rivet 21 which is hingedly mounted in the slide 22, the latter having an opening in its upper end through which passes the rod 18. The aisle post 11 is provided with an opening 23 which is circular in form but which has two horizontally disposed ledges 24 adapted to receive the handle 25 which is secured to the inner end of the trough 19 as shown in Figures 1 and 5. The handle 25 is also provided with notches fitting over these shoulders so as to lock the trough in the closed position as shown in Figure 1.

In the closed position the slide 22 encounters a stop 26 on the rod 18 and a rivet 21 strikes a stop 27 which is carried by the post 12. The shell 16 closely fits the outer end of the trough 19 so as to insure the rivet 21 striking the stop 27.

The method of operation of this device is as follows:

The normal position of the parts is that shown in Figure 1 with the trough 19 pushed in until it encounters the stops 26 and 27. In this position it is impossible to turn the trough because of the shoulders 24 in the opening 23 and also because the shell 16 closely fits the trough 19. In order to dump the trough it is withdrawn through the opening 23 as shown in Figure 2. The rod 18 and the shell 16 gradually diverge toward the inner or aisle end so that as the trough is withdrawn it is gradually raised off the shoulder 24. This shell also, it will be noted, terminates at a point close to the outer end of the trough when the latter is drawn into the aisle. The trough may now be turned about the rivet 21 as an axis and as the greater part of the length of the trough projects into the aisle most of the water and solid matter in the trough is dumped into the aisle. Some of it, however, falls upon the floor of the coop and gradually works its way to the outer edge of the coop due to the sloping floor 10. Any debris which finds its way into the shell 16 will work out through the openings 17.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent is:

1. In a poultry-car containing coops at opposite sides of an aisle having trough insertion openings in their frames at the aisle, partition members between adjacent coops in the same tier including a semi-cylindrical shell, one of said partition members forming a guide which is outwardly converging with respect to said shell, a slide slidable thereon, a semi-cylindrical trough slidable through one of said openings and means for hingedly mounting on said slide the outer end of said trough near the longitudinal axis of the trough so that the trough will substantially rest in the shell when inserted, and will be raised so as to swing free of the shell when drawn out.

2. In a poultry-car containing coops at opposite sides of an aisle having trough insertion openings in their frames at the aisle, partition members between adjacent coops in the same tier, one of said partition members forming a guide, a slide slidable thereon, a semi-cylindrical trough slidable through one of said openings, means for hingedly mounting the outer end of said trough on said slide and a semi-cylindrical shell beneath said trough, said guide and shell converging toward the outer end, so that the trough will substantially rest in the shell when inserted and will be raised so as to swing clear of the shell when drawn out.

PETER KORTENHOEVEN.